(12) United States Patent
Matsui et al.

(10) Patent No.: US 7,542,683 B2
(45) Date of Patent: Jun. 2, 2009

(54) CHIRP MANAGED LASER (CML) TRANSMITTER

(75) Inventors: Yasuhiro Matsui, Lawrence, MA (US); Daniel Mahgerefteh, Somerville, MA (US)

(73) Assignee: Finisar Corporation, Sunnyvale, CA (US)

( * ) Notice: Subject to any disclaimer, the term of this patent is extended or adjusted under 35 U.S.C. 154(b) by 124 days.

(21) Appl. No.: 11/784,411

(22) Filed: Apr. 6, 2007

(65) Prior Publication Data

US 2008/0031636 A1 Feb. 7, 2008

Related U.S. Application Data

(63) Continuation-in-part of application No. 11/702,436, filed on Feb. 5, 2007, and a continuation-in-part of application No. 11/441,944, filed on May 26, 2006, and a continuation-in-part of application No. 11/272,100, filed on Nov. 8, 2005, and a continuation-in-part of application No. 11/084,633, filed on Mar. 18, 2005, and a continuation-in-part of application No. 11/084,630, filed on Mar. 18, 2005, and a continuation-in-part of application No. 11/068,032, filed on Feb. 28, 2005, and a continuation-in-part of application No. 10/308,522, filed on Dec. 3, 2002.

(60) Provisional application No. 60/853,867, filed on Oct. 24, 2006, provisional application No. 60/789,859, filed on Apr. 6, 2006.

(51) Int. Cl.
  *H04B 10/04* (2006.01)
(52) U.S. Cl. ......................... 398/185; 398/201
(58) Field of Classification Search ................ 398/185, 398/199, 201
See application file for complete search history.

(56) References Cited

U.S. PATENT DOCUMENTS 3,324,295 A   6/1967   Harris
3,999,105 A   12/1976  Archey et al.

(Continued)

FOREIGN PATENT DOCUMENTS

GB   2 107 147   4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Leslie Pascal
(74) *Attorney, Agent, or Firm*—Workman Nydegger

(57) ABSTRACT

A fiber optic communication system comprising:
  an optical signal source adapted to receive a binary base signal having a bit period T, and generate a first signal, wherein the first signal is frequency modulated; and
  an optical spectrum reshaper (OSR) adapted to reshape the first signal into a second signal, wherein the second signal is amplitude modulated and frequency modulated;
characterized in that:
  the frequency excursion of the first signal is adjusted such that the frequency excursion is substantially equal to the ratio of the bit period of the digital base signal to total dispersion of the transmission fiber, whereby to increase the tolerance of the second signal to dispersion in a transmission fiber.

7 Claims, 5 Drawing Sheets

PROGRESSION OF DATA THROUGH COMPONENTS
OF THE TRANSMITTER CHAIN

SCHEMATIC OF THE CHIRP MANAGED LASER

U.S. PATENT DOCUMENTS

| | | |
|---|---|---|
| 4,038,600 A | 7/1977 | Thomas et al. |
| 4,561,119 A | 12/1985 | Epworth |
| 4,805,235 A | 2/1989 | Henmi |
| 4,841,519 A | 6/1989 | Nishio |
| 5,293,545 A | 3/1994 | Huber |
| 5,325,378 A | 6/1994 | Zorabedian |
| 5,371,625 A | 12/1994 | Wedding et al. |
| 5,412,474 A | 5/1995 | Reasenberg et al. |
| 5,416,629 A | 5/1995 | Huber |
| 5,465,264 A | 11/1995 | Buhler et al. |
| 5,477,368 A | 12/1995 | Eskildsen et al. |
| 5,550,667 A | 8/1996 | Krimmel et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle et al. |
| 5,920,416 A | 7/1999 | Beylat et al. |
| 5,953,139 A | 9/1999 | Nemecek et al. |
| 5,974,209 A | 10/1999 | Cho et al. |
| 6,081,361 A | 6/2000 | Adams et al. |
| 6,096,496 A | 8/2000 | Frankel |
| 6,104,851 A | 8/2000 | Mahgerefteh |
| 6,115,403 A | 9/2000 | Brenner et al. |
| 6,222,861 B1 | 4/2001 | Kuo et al. |
| 6,271,959 B1 | 8/2001 | Kim et al. |
| 6,298,186 B1 | 10/2001 | He |
| 6,331,991 B1 | 12/2001 | Mahgerefteh |
| 6,359,716 B1 | 3/2002 | Taylor |
| 6,473,214 B1 * | 10/2002 | Roberts et al. .............. 398/183 |
| 6,506,342 B1 | 1/2003 | Frankel |
| 6,577,013 B1 | 6/2003 | Glenn et al. |
| 6,618,513 B2 | 9/2003 | Evankow, Jr. |
| 6,654,564 B1 | 11/2003 | Colbourne et al. |
| 6,665,351 B2 | 12/2003 | Hedberg |
| 6,748,133 B2 | 6/2004 | Liu et al. |
| 6,778,307 B2 | 8/2004 | Clark |
| 6,810,047 B2 | 10/2004 | Oh et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 | 12/2005 | Whiteaway et al. |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| WO | 9905804 | 2/1999 |
| WO | 01/04999 | 1/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17 No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

* cited by examiner

THE ISOLATED 1 BIT AT 10 Gb/s AFTER TRANSMISSION THROUGH 200 km OF STANDARD SINGLE MODE FIBER.

EYE DIAGRAMS OF 40 Gb/s CHIRP MANAGED LASER BACK-TO-BACK (BB) AND AFTER 17 km OF FIBER.

CHIRP MANAGED LASER (CML) TRANSMITTER

REFERENCE TO PENDING PRIOR PATENT APPLICATIONS

This patent application:

(i) is a continuation-in-part of pending prior U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of pending prior U.S. patent application Ser. No. 11/441,944, filed May 26, 2006 by Daniel Mahgerefteh et al. for FLAT DISPERSION FREQUENCY DISCRIMINATOR (FDFD);

(iv) is a continuation-in-part of pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT;

(v) is a continuation-in-part of pending prior U.S. patent application Ser. No. 11/084,630, filed Mar. 18, 2005 by Daniel Mahgerefteh et al. for FLAT-TOPPED CHIRP INDUCED BY OPTICAL FILTER EDGE;

(vi) is a continuation-in-part of pending prior U.S. patent application Ser. No. 11/702,436, filed Feb. 5, 2007 by Kevin McCallion et al. for MULTI-RING RESONATOR IMPLEMENTATION OF OPTICAL SPECTRUM RESHAPER FOR CHIRP MANAGED LASER TECHNOLOGY;

(vii) is a continuation-in-part of pending prior U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION;

(viii) claims benefit of prior U.S. Provisional Patent Application Ser. No. 60/853,867, filed Oct. 24, 2006 by Kevin McCallion et al. for SPECTRAL RESPONSE MODIFICATION VIA SPATIAL FILTERING WITH OPTICAL FIBER; and (ix) claims benefit of prior U.S. Provisional Patent Application Ser. No. 60/789,859, filed Apr. 8, 2006 by Yasuhiro Matsui for HUNT FOR THE BEST PULSE SHAPE.

The nine above-identified patent applications are hereby incorporated herein by reference.

FIELD OF THE INVENTION

This invention relates to signal transmissions in general, and more particularly to the transmission of optical signals.

BACKGROUND OF THE INVENTION

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, sometimes called the sensitivity, is determined. The difference in sensitivity at the output of the transmitter with the sensitivity after propagation is sometimes called dispersion penalty. This is typically characterized by the distance over which a dispersion penalty reaches a level of ~1 dB. A standard 10 Gb/s optical digital transmitter, such as an externally modulated source, can typically transmit up to a distance of ~50 km in standard single mode fiber at 1550 nm before the dispersion penalty reaches the level of ~1 dB, which is sometimes called the dispersion limit. The dispersion limit is determined by the fundamental assumption that the digital signal is transform limited, i.e., the signal has no time varying phase across its bits and has a bit period of 100 ps, or 1/(bit rate), for the standard 10 Gb/s transmission. Another measure of the quality of a transmitter is the absolute sensitivity after fiber propagation.

Three types of optical transmitters are presently in use in prior art fiber optic systems: (i) directly modulated lasers (DML), (ii) Electroabsorption Modulated Lasers (EML), and (iii) Externally Modulated Mach Zhender (MZ) modulators. For transmission in standard single mode fiber at 10 Gb/s, and 1550 nm, it has generally been assumed that MZ modulators and EML can have the longest reach, typically reaching 80 km. Using a special coding scheme, sometimes referred to as phase shaped duobinary, MZ transmitters can reach 200 km. On the other hand, directly modulated lasers (DML) reach <5 km because their inherent time dependent chirp causes severe distortion of the signal after this distance.

By way of example, various systems for long-reach lightwave data transmission (>80 km at 10 Gb/s) through optical fibers which increase the reach of DML to >80 km at 10 Gb/s in single mode fiber are disclosed in (i) U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM, (ii) U.S. patent application Ser. No. 11/441,944, filed May 26, 2006 by Daniel Mahgerefteh et al. for FLAT DISPERSION FREQUENCY DISCRIMINATOR (FDFD) and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR, which patent applications are hereby incorporated herein by reference. The transmitter associated with these novel systems is sometimes referred to as a Chirp Managed Laser (CML™) by Azna LLC of Wilmington, Mass. In these new systems, a Frequency Modulated (FM) source is followed by an Optical Spectrum Reshaper (OSR) which uses the frequency modulation to increase the amplitude modulated signal and partially compensate for dispersion in the transmission fiber. In one embodiment, the frequency modulated source may comprise a Directly Modulated Laser (DML). The Optical Spectrum Reshaper (OSR), sometimes referred to as a frequency discriminator, can be formed by an appropriate optical element that has a wavelength-dependent transmission function, e.g., a filter. The OSR can be adapted to convert frequency modulation to amplitude modulation. See FIG. 1.

In the pending patent applications identified above, we have shown that the frequency modulation of the signal should be adjusted so that it is ~½ times the bit rate of operation, e.g., approximately 5 GHz for a 10 Gb/s digital signal, as an example for extending the reach of the chirp managed laser transmitter in dispersive fiber. This prescription ensures that the relative phase of 1 bits separated by an odd number of 0 bits is π out of phase with each other, such that the bits interfere destructively in the middle of the 0 bit after they propagate in dispersive fiber.

SUMMARY OF THE INVENTION

We have recently discovered that the overall bit error rate of the transmitted signal can be further reduced, and the transmission length through dispersive fiber can be further increased, if the frequency excursion of the modulated signal is adjusted to have the following relation to the fiber length, bit rate and dispersion:

$$D \times L \times \Delta v_{AD} \sim T. \tag{1}$$

Here D is the dispersion of the fiber in ps/GHz/km, L is fiber length in km, $\Delta v_{AD}$ is the frequency excursion of the transmitted signal at the output of the chirp managed laser in GHz, and T is the bit period in picoseconds.

In one preferred embodiment of the present invention, there is provided a fiber optic communication system comprising:

an optical signal source adapted to receive a binary base signal having a bit period T, and generate a first signal, wherein the first signal is frequency modulated; and an optical spectrum reshaper (OSR) adapted to reshape the first signal into a second signal, wherein the second signal is amplitude modulated and frequency modulated;

characterized in that:

the frequency excursion of the first signal is adjusted such that the frequency excursion is substantially equal to the ratio of the bit period of the digital base signal to total dispersion of the transmission fiber, whereby to increase the tolerance of the second signal to dispersion in a transmission fiber.

In another preferred embodiment of the present invention, there is provided a fiber optic communication system comprising:

an optical signal source adapted to receive a binary base signal having a bit period T, and generate a first signal, wherein the first signal is frequency modulated; and an optical spectrum reshaper adapted to reshape the first signal into a second signal, wherein the second signal is amplitude modulated and frequency modulated;

characterized in that:

the frequency excursion of the first signal, $\Delta v_{AD}$, in GHz is adjusted such that it is substantially equal to the ratio of the bit period of the digital base signal, T, in picoseconds, to the product of the transmission fiber length, L, in km, and the dispersion of the transmission fibers, D, in ps$^2$/km, whereby to reduce the bit error rate at transmission distance L.

In another preferred embodiment of the present invention, there is provided a fiber optic communication system comprising:

an optical signal source adapted to receive a binary base signal having a bit period T, and generate a first signal, wherein the first signal is frequency modulated; and an optical spectrum reshaper adapted to reshape the first signal into a second signal, wherein the second signal is amplitude modulated and frequency modulated;

characterized in that:

$\Delta v_{AD} \sim T/(D \times L)$, where $\Delta v_{AD}$ is the frequency excursion of the transmitted signal at the output of the optical signal source in GHz, T is the bit period in picoseconds of the binary base signal, D is the dispersion of the fiber in ps$^2$/km, and L is fiber length in km.

In another preferred embodiment of the present invention, there is provided a method for transmitting a binary base signal through an optical fiber, comprising:

receiving a binary base signal having a bit period T, and generating a first signal, wherein the first signal is frequency modulated;

reshaping the first signal into a second signal, wherein the second signal is amplitude modulated and frequency modulated; and directing the second signal into the optical fiber;

characterized in that:

the frequency excursion of the first signal, $\Delta v_{AD}$, in GHz is adjusted such that it is substantially equal to the ratio of the bit period of the digital base signal, T, in picoseconds, to the product of the transmission fiber length, L, in km, and the dispersion of the transmission fibers, D, in ps$^2$/km, whereby to reduce the bit error rate at transmission distance L.

BRIEF DESCRIPTION OF THE DRAWINGS

These and other objects, features and advantages of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

In accordance with the present invention, it has now been discovered that the overall bit error rate of the transmitted signal can be further reduced, and the transmission length through dispersive fiber can be further increased, if the frequency excursion of the modulated signal is adjusted to have the following relation to the fiber length, bit rate and dispersion:

$$D \times L \times \Delta v_{AD} \sim T. \quad (1)$$

Here D is the dispersion of the fiber in ps$^2$/km, L is fiber length in km, $\Delta v_{AD}$ is the frequency excursion of the transmitted signal at the output of the chirp managed laser in GHz, and T is the bit period in picoseconds.

The increased distance may come at the cost of reducing the bit error rate at the transmitter output. More particularly, Equation (1) states that the optimum frequency excursion for the transmitted signal is to be chosen for a particular dispersion such that the blue shifted frequency of the chirp is translated by one bit. Note that our simulations and experiments show that the transmitted signal is error free for all distances less then L. In addition, the optical eye diagram, which is a graphical representation of the integrity of the digital bit sequence, remains open and the data is recognizable for all lengths below L, as given by Equation (1). So given a particular chirp, $\Delta v_{AD}$, Equation (1) predicts the maximum distance that can be transmitted error free, but not necessarily the optimum distance.

The bit error rate of a random digital bit sequence is determined by the sum of the bit error rates of all of the different bit sequences. Typically certain bits have higher probability of error than other bits because of the frequency content. For example, a 1 bit in the middle of a long string of 1s, such as 1111, at 10 Gb/s tends to have a lower bit error rate than a 0 bit between two 1 bits, i.e., 101. The value of the frequency excursion (i.e., chirp) is therefore adjusted so as to reduce the error probability for the bit sequences that are most likely to produce errors. In our previous work, the condition that the chirp, $\Delta v_{AD}$=5 GHz (for a 10 Gb/s signal) mostly effectively reduces the error probability of the 101 bit sequence. We have found that the destructive interference in the 0 bit of the 101 bit sequence is quite tolerant to the exact value of chirp, because of the insensitivity of the $\cos^2(\phi)$ function, which determines the intensity of the destructive interference term, where $\phi$ is the phase difference between the 1 bits.

Figure 1:
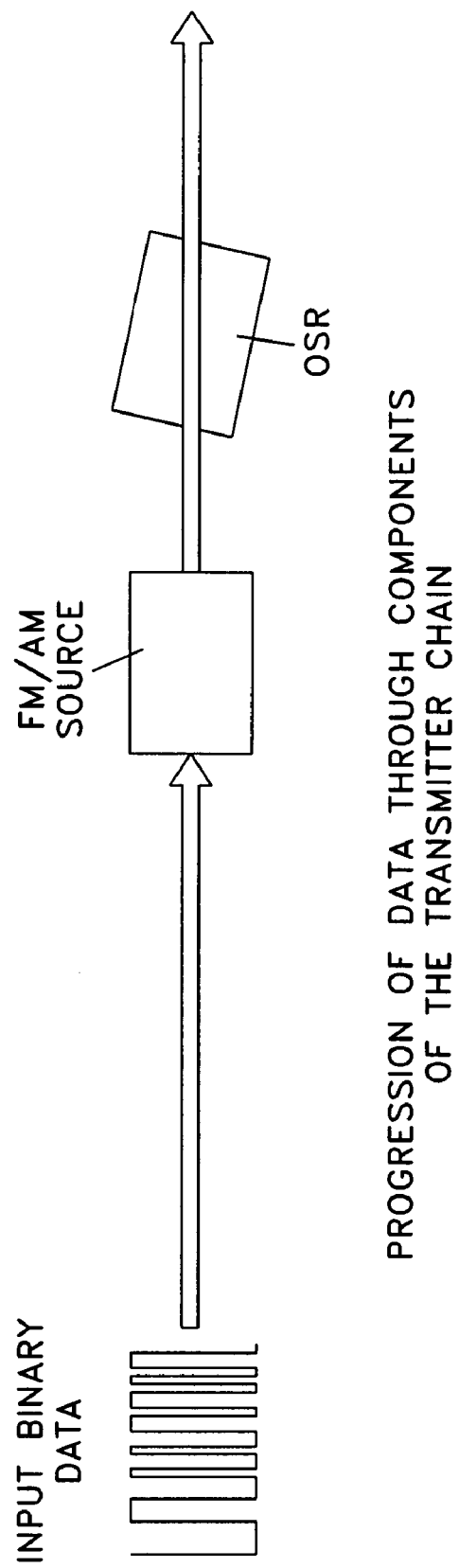
FIG. 1 is a schematic diagram showing a chirp managed laser (CML) transmitter.
Figure 2:
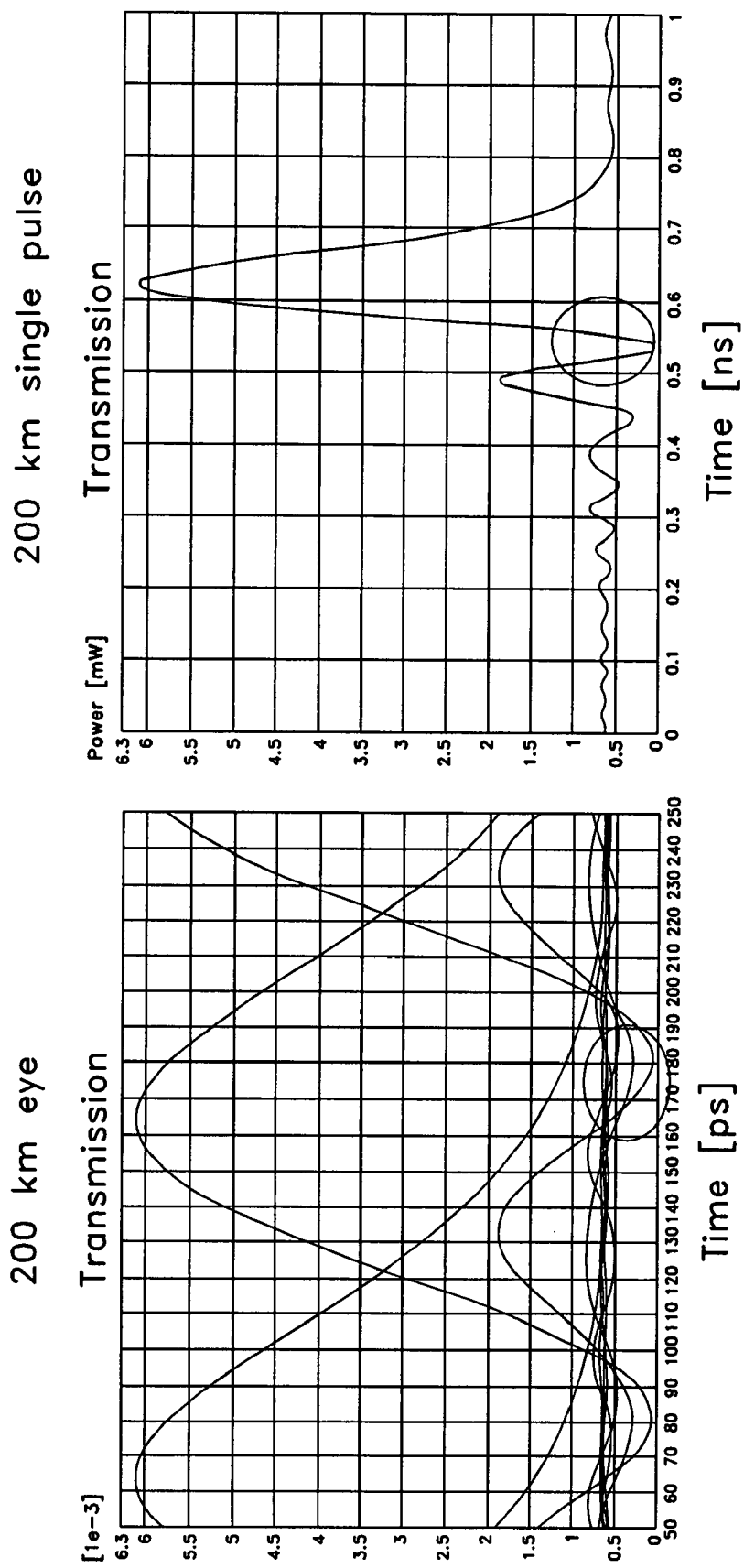
FIG. 2 shows the isolated 1 bit at 10 Gb/s after transmission through 200 km of standard single mode fiber.

For longer distances, isolated 1 bits (such as 010) are more likely to generate errors. The new condition of Equation (1) is therefore designed to reduce the distortions of the isolated 1 bit (for example, in the string 010). As shown in FIG. 2, the blue shifted component of the isolated pulse interferes destructively with its red shifted side wings as well as any remaining energy in the adjacent 0 bits. We sometimes call this intra-pulse interference. This leads to oscillations on the rising edge of the pulse, while the falling edge shows a slow decay without oscillations. Given the optimum chirp, for distances below that given by Equation (1), the destructive oscillations are such that their troughs are in the adjacent bit center, while the peak of the intra-pulse interference are in between the bits, away from the optimum decision point in the bit. As the length increases and Equation (1) is satisfied, the peak in the interference moves to the center of the adjacent pulses, where it causes 1→0 errors—hence, Equation (1) determines the maximum distance of propagation with reduced error rate. Note that a smaller value of chirp is needed for a longer distance and higher dispersion. However, a lower chirp usually degrades the performance at the output of the transmitter before fiber propagation. The optimum value of chirp is, therefore, a compromise between performance after fiber propagation and before fiber propagation.

Figure 3:
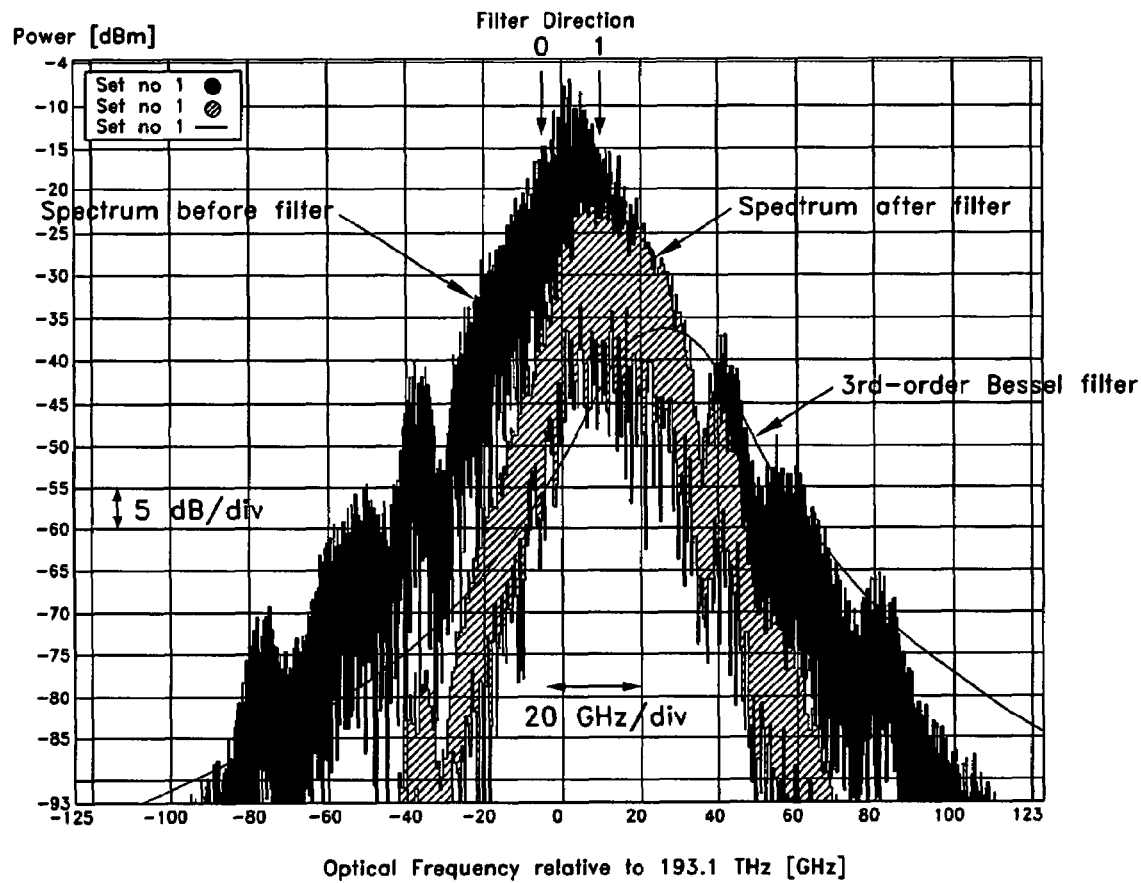
FIG. 3 shows the optical spectrum of a 40 Gb/s directly modulated DFB laser (i.e., the FM source) before and after the OSR (i.e., the filter)

As an example of the application of the prescription of Equation (1), we have demonstrated in simulation that the optimum value of frequency excursion at 40 Gb/s is 12 GHz for a maximum distance of 17 km and a dispersion of 17 ps/nm/km. Similar relations as in Equation (1) hold for the case of 2.5 Gb/s and >1000 km transmission in fibers with dispersion of 17 ps/nm/km. FIG. 3 shows the optical spectrum of a 40 Gb/s directly modulated distributed feedback (DFB) laser before and after an optical spectrum reshaper filter. Note that, in addition, we have found the optimum filter shape to be a $3^{rd}$ order Bessel filter with 3 dB bandwidth of 22 GHz and maximum slope of 0.8 dB/GHz.

Figure 4:
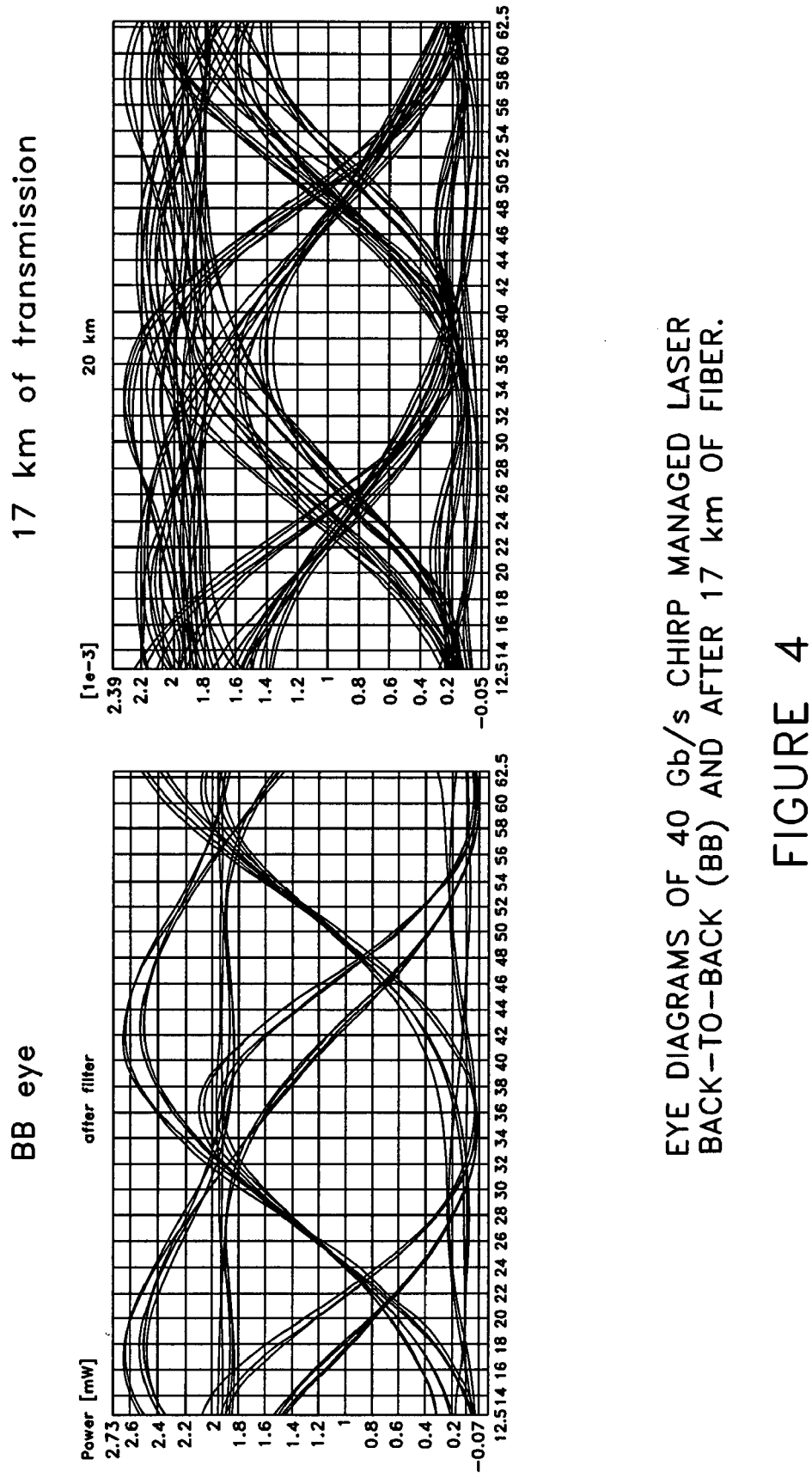
FIG. 4 shows the eye diagrams of 40 Gb/s chirp managed laser (CML) back-to-back (BB) and after 17 km of fiber.

FIG. 4 shows the eye diagram of the 40 Gb/s chirp managed laser (CML) before and after propagation through 17 km of fiber with 17 ps/nm/km dispersion. Note that the optical eye diagram is open for both cases. The chirp value in this case was chosen to be 12 GHz. The laser was biased at 80 mA and driven by 30 mA modulation. Note that a higher value of chirp would result in a better eye opening and lower bit-error rate before transmission, but at the cost of a poorer bit error rate after propagation through the fiber.

Figure 5:
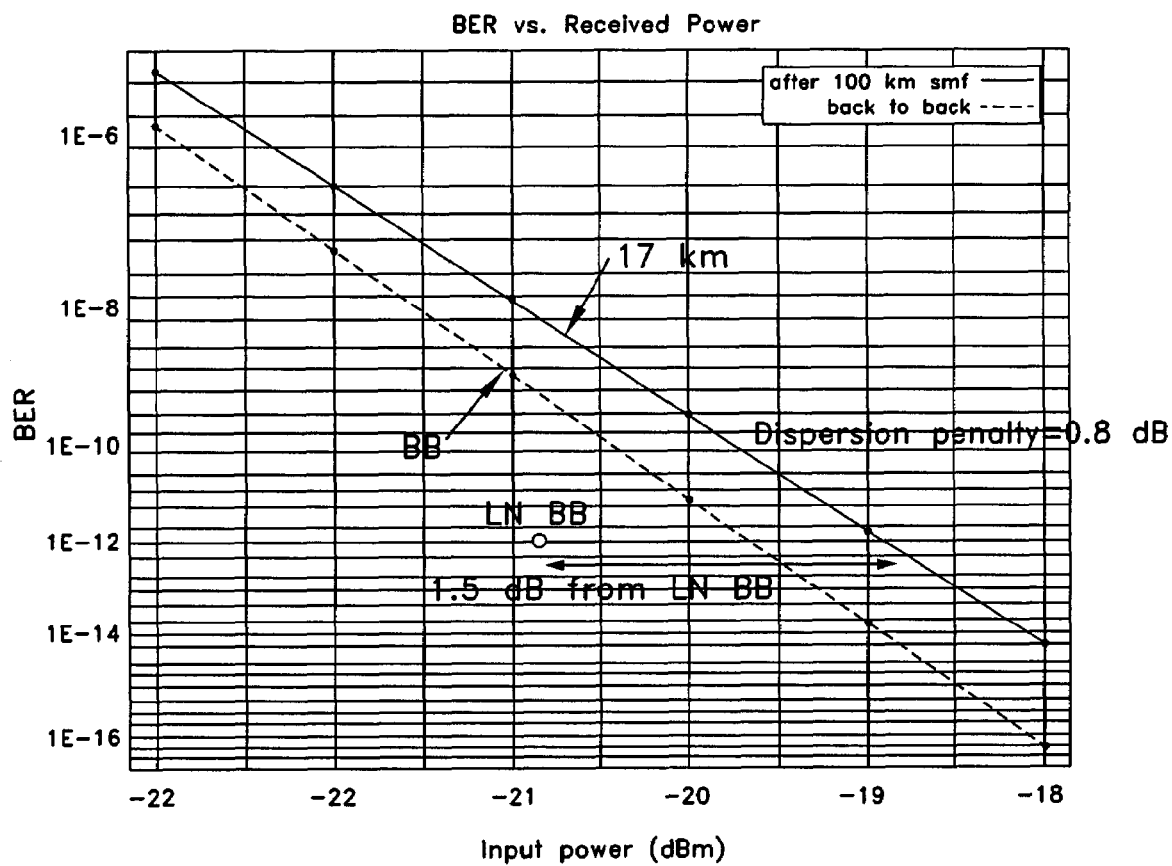
FIG. 5 shows the simulated bit error rate as a function of received optical power for the same condition.

FIG. 5 shows the simulated bit error rate as a function of received optical power for the same condition. The back-to-back bit sensitivity, i.e., required optical power to achieve $10^{-12}$ bit error rate, is 1.5 dB worse than that of a standard ideal modulator such as lithium niobate external modulator. The reach of 17 km would, however, not be possible with conventional modulation.

MODIFICATIONS

It will be understood that many changes in the details, materials, steps and arrangements of parts, which have been herein described and illustrated in order to explain the nature of the invention, may be made by those skilled in the art without departing from the principles and scope of the present invention.

What is claimed is:

1. A method for transmitting a binary base signal through an optical fiber, comprising:

modulating a laser with a binary base signal having a bit period T, and generating a first signal from the laser, wherein the first signal is frequency modulated having a frequency excursion, $\Delta\upsilon$;

reshaping the first signal into a second signal, wherein the second signal is amplitude modulated and frequency modulated; and directing the second signal into the optical fiber having a transmission fiber length, L, in km and a dispersion, D, in $ps^2/km$;

characterized in that:

the frequency excursion of the first signal, $\Delta\upsilon$, in GHz is substantially equal to the ratio of the bit period of the digital base signal, T, in picoseconds, to the product of the transmission fiber length, L, and the dispersion of the transmission fibers, D, whereby to reduce the bit error rate at transmission distance, L.

2. A method according to claim 1 wherein the laser is a distributed feedback (DFB) laser.

3. A method according to claim 1 wherein reshaping the first signal into a second signal comprises passing the first signal through a filter.

4. A method for operating a transmitter including a laser having an output thereof coupled to an optical fiber having a length L and a dispersion D, the method comprising:

modulating a laser with a binary base signal having a bit period T such that the laser outputs a frequency modulated light having a frequency excursion $\Delta\upsilon$; and coupling the output of the laser to the optical fiber;

wherein the frequency excursion $\Delta\upsilon$ is substantially equal to the ratio of the bit period of the digital base signal T to the product of the transmission fiber length L and the dispersion D of the transmission fiber, whereby to reduce the bit error rate at a transmission distance of length L.

5. The method of claim 4, further comprising a filter positioned between the laser and the optical fiber.

6. The method of claim 4, wherein the laser is a distributed feedback (DFB) laser.

7. A method for transmitting binary data comprising:

modulating a laser with a binary base signal having a bit period T such that the laser outputs a first frequency modulated signal having a frequency excursion $\Delta\upsilon$;

transmitting the first frequency modulated signal through a filter such that the filter outputs a second frequency modulated signal having increased amplitude modulation relative to the first frequency modulated signal; and coupling the second frequency modulated signal to an optical fiber having a transmission length L and a dispersion D;

wherein the frequency excursion $\Delta\upsilon$ is substantially equal to the ratio of the bit period T to the product of the transmission fiber length L and the dispersion D.

* * * * *